United States Patent
Basile et al.

(12)

(10) Patent No.: US 6,221,273 B1
(45) Date of Patent: *Apr. 24, 2001

(54) REFRIGERATING COMPOSITIONS BASED ON HEXAFLUOROPROPANE, FLUOROETHERS AND HYDROCARBONS

(75) Inventors: Giampiero Basile; Ezio Musso, both of Alessandria (IT)

(73) Assignee: Ausimont S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/112,447

(22) Filed: Jul. 9, 1998

(30) Foreign Application Priority Data

Jul. 11, 1997 (IT) .............................................. MI97A1654

(51) Int. Cl.[7] ....................................................... C09K 5/04
(52) U.S. Cl. ................................ 252/68; 252/67; 62/114; 510/408; 510/410; 510/411; 510/412
(58) Field of Search ........................ 252/67, 68; 510/411, 510/410, 408, 412; 62/114

(56) References Cited

U.S. PATENT DOCUMENTS 5,169,873 * 12/1992 Behme et al. ........................ 521/114
5,264,462 * 11/1993 Hodson et al. ......................... 521/88
5,458,798 * 10/1995 Lunger et al. .......................... 252/67
5,538,659 * 7/1996 Chisolm et al. ....................... 252/67
5,552,074 * 9/1996 Patron et al. .......................... 252/67
5,605,882 * 2/1997 Klug et al. ............................ 510/411
5,645,754 * 7/1997 Minor et al. ........................... 252/67
5,801,132 * 9/1998 Kaneko et al. ....................... 508/579

FOREIGN PATENT DOCUMENTS

WO 93/24586  12/1993  (EP) .
WO 94/09083   4/1994  (EP) .
WO 94/18282   8/1994  (EP) .
WO 94/20587   9/1994  (EP) .

OTHER PUBLICATIONS

D.A. Didion e D.B. Bivens "Role of refrigerant mixtures as alternatives to CFCs" in Int. J. of Refrigeration (vol. 13, p. 163), May 1990.
Chemical Abstracts, 122:294194, "Investigation of HFC-236ea and HFC-236fa as CFC-114 replacements in high temperature heat pumps", Kazachki et al., 1994.*

* cited by examiner

*Primary Examiner*—Margaret Einsmann
(74) *Attorney, Agent, or Firm*—Arent Fox Kintner Plotkin Kahn PLLC

(57) ABSTRACT

Azeotropic or near azeotropic compositions based on hexafluoropropane (R 236) as substitutes of $CClF_2$-$CClF_2$ (R 114) which essentially consist of R 236 and bis (difluoromethyl)-ether or n-butane, or mixtures thereof, for heat pumps, air-conditioners, etc.

6 Claims, No Drawings

REFRIGERATING COMPOSITIONS BASED ON HEXAFLUOROPROPANE, FLUOROETHERS AND HYDROCARBONS

The present invention relates to working fluids based on hydrofluorocarbons (HFC) as substitutes of $CClF_2$-$CClF_2$ (R 114)

More particularly the present invention relates to binary and ternary azeotropic or near azeotropic mixtures to be used in combination with suitable lubricants as substitutes of R 114 (1, 2-dichlorotetrafluoroethane), environmental friendly, that is, completely inert towards the stratosphric ozone layer (ODP=0) and which are charaterized by a low global warming power (low GWP) and any how lower than that of R 114.

It is well known that R 114 was widely used as refrigerating fluid in circuits for the conditioning of buildings and especially as fluid for heat pumps for industrial applications with condensation temperatures up to 120° C. In this last application the refrigerating machine is used for heating; indeed the heat drawn from the evaporator, from a source whose temperature is lower than the desired one, is transferred at a higher temperature to the condenser, by means of a mechanical work carried out by the compressor.

The heat pumps allow, therefore, the recovery of thermal energy at a higher temperature by using energy sources at low temperature.

Since Jan. 1st, 1995 the production and commercialization of R 114, and in general of chlorofluorocarbons (CFC) have been banned for applications of this kind due to the high depleting potential on the ozone layer.

Therefore it is particularly felt the need to find other fluids able to replace R 114 in the above applications while respecting and protecting the environment. For this purpose the use of hydrofluorocarbons (HCFC) has been proposed, in which has thermodynamic characteristics similar to R 114 ones, but still showing the disadvantage of a destroying effect on the ozone layer. R 124 is considered a transition product and its use will be limited in the time, since subjected, as all the HCFCs, to regulation.

It is therefore evident the need to have an alternative fluid able to definitively overcome the still present environmental problems, even though in a more contained extent, by using HCFC type substitutes and able to give a definitive alternative to the substitution of R 114 both for applications on new equipments, and for the recovery of those existing.

The Applicant has unexpectedly and surprisingly found HFC-based azeotropic mixtures characterized by vapour pressure curves particularly suitable as substitutes of R 114 which have an environmental impact expressed in ODP terms equal to zero and very low GW values, which allow applications on new circuits and the economic recovery of the existing ones.

It is a remarkable advantage to have available azeotropic compositions since it allows to avoid the component segregation in binary and ternary systems, in practice a refrigerating fluid maintaining the same behaviour also in the case of leak is available. Indeed, in the case of non azeotropic mixtures, due to the different volatility of the components, there is segregation during the change from the liquid to the vapour phase or viceversa, with consequent variation of the evaporation and condensation temperature, so as to also sensibly compromise the efficiency of the thermal exchange and therefore the performances of the refrigerating circuit.

Moreover, due to often unavoidable leaks from the refrigerating plant, it is necessary to carry out the total substitution of the remaining fluid, in order to recover the initial performances (such as volumetric capacity and coefficient of performance (COP), vapour pressure, solubility with lubricants)).

Moreover, if the mixture contains more volatile flammable components, the vapour phase becomes rich in such a component until reaching the flammability limit, with evident dangers for the use safety.

Likewise, if the flammable component is less volatile, it concentrates in the liquid phase, giving a flammable liquid.

In order to avoid such drawbacks it is necessary to have available azeotropic mixtures.

It has been unexpectedly found that the azeotropic mixture has also a combination of performances which are particularly suitable to replace R 114.

The Applicant has also found that mixtures around the azeotrope have a near azeotropic behaviour, as defined hereinafter, and that therefore they too can be used as substitutes of R 114. A near azeotrope blend is a mixture of two or more fluids which has a vapour composition substantially equal to that of the liquid and undergoes phase changes without substantially modifying its composition and temperature.

An object of the present invention consists therefore in azeotropic or near azeotropic compositions based on hexafluoropropane (R 236) as substituents of R 114 which consist essentially of:

| | | |
|---|---|---|
| I) | 1,1,1,2,3,3-hexafluoropropane (R 236ea) | 15–95% by wt. |
| | bis (difluoromethyl)ether (RE 134) | 5–85% by wt. |
| II) | 1,1,1,3,3,3-hexafluoropropane (R 236fa) | 30–90% by wt. |
| | bis (difluoromethyl)ether (RE 134) | 10–70% by wt. |
| III) | 1,1,1,3,3,3-hexafluoropropane (R 236fa) | 90–98% by wt. |
| | n-butane (R 600) | 2–10% by wt. |
| IV) | 1,1,1,3,3,3-hexafluoropropane (R 236fa) | 35–85% by wt. |
| | n-butane (R 600) | 2–10% by wt. |
| | bis (difluoromethyl)ether (RE 134) | 5–63% by wt. |
| V) | 1,1,1,3,3,3-hexafluoropropane (R 236fa) | 40–88% by wt. |
| | n-butane (R 600) | 2–10% by wt. |
| | 1,1,1,2,3,3-hexafluoropropane (R 236ea) | 2–58% by wt. |
| The azeotropes have the following compositions: | | |
| I) | 1,1,1,2,3,3-hexafluoropropane (R 236ea) | 54.9% by wt. |
| | bis (difluoromethyl)ether (RE 134) | 45.1% by wt. |
| II) | 1,1,1,3,3,3-hexafluoropropane (R 236fa) | 65.2% by wt. |
| | bis (difluoromethyl)ether (RE 134) | 34.8% by wt. |
| III) | 1,1,1,3,3,3-hexafluoropropane (R 236fa) | 94.1% by wt. |
| | n-butane (R 600) | 5.9% by wt. |
| IV) | 1,1,1,3,3,3-hexafluoropropane (R 236fa) | 57.8% by wt. |
| | n-butane (R 600) | 4.9% by wt. |
| | bis (difluoromethyl)ether (RE 134) | 37.3% by wt. |
| V) | 1,1,1,3,3,3-hexafluoropropane (R 236fa) | 81.6% by wt. |
| | n-butane (R 600) | 3% by wt. |
| | 1,1,1,2,3,3-hexafluoropropane (R 236ea) | 15.4% by wt. |

An azeotrope is a particular blend having specific, unexpected and unforeseeable chemical physical properties, the most important are reported hereinafter. An azeotrope is a mixture of two or more fluids which has the same composition in the vapour and in the liquid phase. The azeotropic composition is defined by particular temperature and pressure values; in these conditions the mixtures undergo phase changes at a constant composition and temperature as though they were pure compounds.

A near azeotrope is mixture of two or more fluids having a vapour composition substantially equal to that of the liquid and undergoes phase changes without substantially modifying its composition and temperature. According to the present invention a composition is near azeotropic when, after evaporation at a constant temperature of 50% of the initial liquid mass, the per cent variation of the vapour pressure between that of the initial and that of the final composition results lower than about 10%. See on the matter the paper of Didion and D. B. Bivens in Int.J. Of Refrigeration, (vol.13, page 163, 1990).

In the case of an azeotrope no variation of the vapour pressure between that of the initial composition and that obtained after evaporation of 50% of the liquid is noticed.

The azeotropic or near azeotropic mixtures fall within the cases which show sufficiently positive or negative deviation from the Raoult's law valid for ideally behaving systems.

Deviations with respect to the ideality are caused by unexpected and unforeseeable intermolecular interactions among the components of the binary or ternary system such as to generate higher or lower interactions than those existing among the molecules of the pure products. When such deviations are sufficiently marked, the vapour pressure of the mixture in the azeotropic point is charaterized by either lower or higher values than that of the pure components.

It is evident that, if the mixture vapour pressure curve shows a maximum, this corresponds to a minimum of the boiling temperature; viceversa to a minimum value of the vapour pressure it corresponds a maximum of the boiling temperature.

There is a range of compositions containing the azeotrope where the mixtures show properties similar to those of the true azeotrope in terms of boiling temperature and of tendency not to undergo segregations during the phase changes, i.e., there is a range of compositions around that of the azeotrope where near azeotropic mixtures are identified.

The azeotropic mixture shows only one composition for each value of the temperature and pressure.

However, by changing temperature and pressure, several different azeotropic compositions starting from the same components can be obtained.

For instance the combination of all the compositions of the same components which have an absolute minimum or a maximum in the boiling temperature at different pressure levels form a range of compositions all azeotropic.

On the other side the combination of all the compositions of the same components which have a relative minimum or maximum in the boiling temperature at different pressure levels form a range of compositions all near azeotropic.

Moreover, the azeotropic or near azeotropic refrigerating mixtures defined at points III, IV and V containing hydrocarbon result non flammable for an hydrocarbon content lower than about 5% by weight. This is an advantage since, in the case of leak, these mixtures never show flammability.

It has been unexpectedly found that the azeotropic or near azeotropic compositions of the invention have a good solubility with lubricant polyols esters oils (POE) and the perfluoropolyethers (PFPE). This is a further advantage of the compositions of the invention since POE is the oil commonly used in the refrigeration.

A further object of the present invention is represented by working fluids comprising:

A) azeotropic or near azeotropic compositions as defined above; and

B) lubricant oil selected from polyols esters (POE) and perfluoropolyethers (PFPE).

It has been found that these lubricants B) have good solubility with the refrigerating mixtures mentioned at point A) and allow a suitable compressor mechanical member lubrication and a very good chemical stability towards the materials used in the circuits for the environmental conditioning and for industrial heat pumps at high temperature.

The POE oils are suitable to the lubrication in domestic, commercial, car-transport refrigeration and in the buildings air-conditioning, together with the HFC refrigerants, and are also directed to the recovery of existing plants, in substitution of the mineral oil, but, especially, they are commonly used in new equipments.

The PFPE oils are particularly suitable in high temperature applciations as in heat pumps, whose application field is claimed herein. This because of their exceptional thermal stability due to the presence of fluorine atoms in the molecular structure which guarantees also a very good chemical stability towards the aggressive chemical agents by chance released during the plant life. It is moreover known to the skilled in the art the high lubricant power at high temperatures characteristic of the PFPE-based oils and greases.

The POE and PFPE oils suitable for these applications must have a good solubility in the refrigerant in order to assure a sufficient return of the lubricant from the evaporator to the compressor and to maintain an appropriate lubrication of the mechanical gears of the compressor; moreover, the system formed by these lubricants in combination with the referigerating compositions of the invention must have a good chemical stability in contact with the circuit devices also at high tmperature, typical of heat pump circuits.

The suitable POE and PFPE oils must be characterized by:

a solubility of at least 5.0% by weight in the above mixtures in a temperature range preferably comprised between −5° and +60° C. for the applications directed to climatization and preferably between +5° and +80° C. for heat pump applications;

a viscosity at 40° C. comprised between 18–110 cSt;

a viscosity index at 20° C. comprised between 90–200;

an initial acidity value <0.15 mg KOH/g oil;

an acidity value after ASHRAE test (14 days/175° C.; see the examples) <0.3 mgKOH/g oil;

a moisture content lower than 50 ppm;

a Pour Point <−5° C.

Moreover, when the above mentioned oils are dissolved in the refrigerating mixtures of the invention and put into contact with metal devices at high temperature (ASHRAE test) must assure on the whole a very high chemical stability, i.e., neither meaningful oil decomposition phenomena nor meaningful metal surface variations must be noted and the content of the degradation by-products of the refrigerating mixture must preferably be <0.2% by weight based on the amount of the used refrigerating fluid.

The compositions of the working fluids formed by the previously indicated refrigerating mixtures in combination with the POE and PFPE lubricants are typically comprised between 35–99% by weight of the refrigerating fluid and between 1–65% by weight of lubricant.

The compositions of the previously indicated working fluids can be used in circuits working according to the Rankine cycle with the purpose of cooling, by evaporation of the refrigerating fluid in an exchanger able to take away heat from the source at a lower temprature, or of heating, by condensation of the refrigerating fluid in an exchanger able to transfer heat at an higher temperature, by using a compressor as mechanical device able to give work to the refrigerating fluid undergone to the phase changes.

The mechanical members of the compressor will be properly lubricated by the oils forming the compositions of the working fluids object of the present invention.

The referigerating mixtures of III, IV, V type can also be used in combination with mineral or alkylbenzene type oils, usually employed with R 114. Indeed it has been found that the compositions of the invention containing hydrocarbon are compatible also with these oils.

The mixtures of III, IV, V type are therefore "drop in" substitutes of R 114, since they can be used in the old plants without requiring the substitution of the mechanical parts or that of the lubricant oil of conventional type. Unexpectedly it has been noted that small percantages of n-butane present in these mixtures allow to notably improve the compatibility of the conventional mineral type lubricants with the HFC type refrigerants, which, as known, are incompatible with these oils. The presence of the hydrocarbon allows the return of the oil from the heat exchangers, which represent the critical zones of the plant, to the compressor, so maintaining the lubrication, avoiding anomalous wear phenomena of the mechanical parts and undesired accumulations of oil in the evaporator and/or in the condenser.

It has been found by the Applicant that the drop in mixtures used in combination with the conventional oils, contrary to the products of HCFC (R 124) type, do not cause also at high temperatures and for long contact times significant alterations both of the oil and of the metal parts usually present in the circuits for conditioning or for heat pumps, thus showing a very good chemical stability.

All the mixtures of the present invention have, as said, azeotropic or near azeotropic behaviour; these characteristics have been identified by evaluating the boiling temperature at constant pressure. They are characterized by absolute and relative minima of the boiling temperature with respect to the pure components.

In the present invention the azeotropic composition is defined as that composition which shows an absolute minimum of the boiling temperature at the pressure of 1.01 bar. In the composition range close to the azeotropic one it is possible to identify those characterized by relative minima of the boiling temperature and called therefore near azeotropes.

The present definition of azeotropic composition does not obviously limit the purpose of this invention to a specific composition, since, as it has already been said, it changes when the pressure at which the evaluation of the boiling temperature is carried out, varies.

The azeotropic or near azeotropic mixtures besides the mentioned advantages, show advantageous behaviours from the point of view of the refrigerating performances with respect to the pure components. Specifically, in the case of azeotropes of minimum temperature, as those described in the present invention, the evaporation and suction temperature in the compressor being equal, the azeotrope vapour pressure is higher than that of the pure components, this allows to have refrigerating or heating volumetric capacities, expressed as amounts of heat exchanged for volume unit of refrigerant, higher than that of the pure components. In other words, the compressor displacement being equal, the vapour phase of the azeotrope or the near azeotrope at the compressor suction has higher densities, therefore a greater amount of refrigerant for volume unit and therefore a greater amount of heat taken away from the evaporator or transferred to the condenser. These advantages obviously mean an improved process since, the same refrigerating or heating capacity being required, it is possible to build a compressor of smaller sizes and pipes having a smaller diameter. Moreover, in the case of existing compressors, the displacement being equal, an higher value of volumetric capacity is obtained and therefore an energy saving, the efficiency being the same.

Some working examples of the present invention are reported hereinafter, whose purpose is merely illustrative but not limitative of the scope of the invention itself.

EXAMPLE 1

Evaluation of the Azeotropic or Near Azeotropic Behaviour

The mixture of known composition and weight is introduced in a small glass cell, previously evacuated, having an internal volume equal to 20 cm$^3$, equipped with metal connections, load valve and a pressure transducer to evaluate the system vapour pressure.

The filling volume ratio is initially equal to 0.8% by volume.

The glass container is introduced in a thermostatic bath of viscosimetric type with double window for the internal observation.

The constancy of the thermostatic bath was evaluated to be within ±0.01° C. in the examined working field.

The temperature is slowly changed until an equilibrium value of the vapour pressure equal to 1.01 bar is obtained.

The corresponding temperature is recorded and represents the mixture boiling temperature at the pressure of 1.01 bar.

The temperature is externally measured with a thermometer whose accuracy is equal to ±0.01° C.; particular attention was paid so that the external temperature measured in the bath is really the internal one of the cell.

By varying the mixture composition it is possible to evaluate possible deviations with respect to the ideality and it is therefore possible to identify the azeotropic composition which, as said, will be characterized by an absolute minimum.

In order to confirm the azeotropic or near azeotropic behaviour, the mixture characterized by a minimum of the boiling temperature and others identified close to the azeotrope were subjected to evaporation test at the constant temperature of the azeotrope.

The cell content is removed at constant temperature by evaporation until having a loss corresponding to 50% by weight of the initial amount.

From the evaluation of the initial and final pressure the per cent variation of the vapour pressure is calculated:

if the decrease is equal to zero the mixture in those conditions is an azeotrope, if the decrease is <10% about its behaviour is of a near azeotrope. It is obvious that a near azeotropic mixture will have a behaviour closer and closer to a true azeotrope if the % variation is lower and lower and near to zero.

In Tables 1, 2, 3, 4 and 5 the trends of the boiling temperatures, in connection with the composition of the refrigerating mixtures of the invention, are reported; in Tables 1a, 2a, 3a, 4a and 5a the per cent variations of the mixture vapour pressure are reported confirming the azeotropic and near azeotropic behaviour.

TABLE 1 evaluation of the boiling temperature of the mixture
I (R 236ea/E 134)

| Composition RE 134 % wt. | Boiling temperature ° C. (1.01 bar) |
|---|---|
| 0.0 | 6.37 |
| 15.5 | 4.79 |
| 30.5 | 3.94 |
| 45.1* | 3.72 |
| 50.2 | 3.79 |
| 61.8 | 4.05 |
| 70.2 | 4.30 |
| 82.7 | 5.20 |
| 100.0 | 6.40 |

*Azeotrope

TABLE 1a per cent variation of the vapour pressure due to evaporation losses of the mixture I

| Example No. | Composition, % wt. R 236ea | RE 134 | Temperature °C. | Initial pressure bar | (ΔP/P) 100 |
|---|---|---|---|---|---|
| 1 (Azeotrope) | 54.9 | 45.1 | 3.72 | 1.01 | 0.00 |
| 2 | 70.5 | 29.5 | 3.72 | 1.00 | 1.00 |
| 3 | 30.2 | 69.8 | 3.72 | 0.99 | 1.01 |

TABLE 2 evaluation of the boiling temperature of the mixture II (R 236fa/E 134)

| Composition, R 236fa, % wt. | Boiling temperature °C. (1.01 bar) |
|---|---|
| 0.0 | 6.37 |
| 10.1 | −0.88 |
| 30.5 | −5.61 |
| 50.2 | −6.41 |
| 65.2* | −6.87 |
| 70.5 | −6.73 |
| 81.7 | −6.28 |
| 92.1 | −4.38 |
| 100.0 | −1.38 |

*Azeotrope

TABLE 2a per cent variation of the vapour pressure due to evaporation losses of the mixture II

| Example No. | Composition, % wt. R 236ea | RE 134 | Temperature °C. | Initial pressure, bar | (ΔP/P) 100 |
|---|---|---|---|---|---|
| 4 (Azeotrope) | 65.2 | 34.8 | −6.87 | 1.01 | 0.00 |
| 5 | 81.5 | 18.S | −6.87 | 0.89 | 3.06 |
| 6 | 30.2 | 69.8 | −6.87 | 0.96 | 6.25 |

TABLE 3 evaluation of the boiling temperature of the mixture III (R 236fa/600)

| Composition, R 236fa, % wt. | Boiling temperature °C. (1.01 bar) |
|---|---|
| 0.0 | −0.55 |
| 30.0 | −0.81 |
| 50.2 | −1.03 |
| 70.5 | −1.28 |
| 93.2 | −1.46 |
| 94.1* | −1.47 |
| 95.2 | −1.46 |
| 96.3 | −1.43 |
| 100.0 | −1.38 |

*Azeotrope

TABLE 3a per cent variation of the vapour pressure due to evaportion losses of the mixture III

| Example No. | Composition, % wt. R 236fa | RE 600 | Temperature °C. | Initial pressure, bar | (ΔP/P) 100 |
|---|---|---|---|---|---|
| 7 (Azeotrope) | 94.1 | 5.9 | −1.47 | 1.01 | 0.00 |
| 8 | 93.2 | 6.8 | −1.47 | 1.01 | 0.00 |

TABLE 4 evaluation of the boiling temperture of the mixture IV (R 236fa/600/E 134)

| Composition, % wt. R 236fa | R 600 | Boiling temperature °C. (1.013 bar) |
|---|---|---|
| 9.3 | 5.0 | −3.54 |
| 25.1 | 4.9 | −5.50 |
| 30.8 | 5.0 | −5.79 |
| 48.5 | 5.0 | −6.60 |
| 57.8* | 4.9 | −6.90 |
| 67.7 | 4.9 | −6.50 |
| 75.5 | 5.0 | −5.96 |
| 87.5 | 5.0 | −4.32 |
| 93.0 | 5.0 | −2.46 |

*Azeotrope

TABLE 4a per cent variation of the vapour pressure due to evaporation losses of the mixture IV

| Example No. | Composition, % wt. R 236fa | R 600 | R 134 | Temperature, °C. | Initial pressure bar | (ΔP/P) 100 |
|---|---|---|---|---|---|---|
| 9 (Azeotrope) | 57.8 | 4.9 | 37.3 | −6.90 | 1.01 | 0.00 |
| 10 | 48.2 | 5.0 | 46.8 | −6.90 | 1.00 | 2.00 |
| 11 | 67.2 | 4.9 | 27.9 | −6.90 | 0.99 | 1.01 |

TABLE 5 evaluation of the boiling temperature of the mixture V (R 236fa/600/236ea)

| Composition, % wt. R 236fa | R 600 | Boiling temperature °C. (1.013 bar) |
|---|---|---|
| 9.6 | 3.0 | −2.96 |
| 28.8 | 2.9 | 1.02 |
| 48.8 | 3.0 | −0.78 |
| 67.2 | 3.0 | −1.55 |
| 81.6* | 3.0 | −1.75 |
| 83.0 | 2.9 | −1.69 |
| 86.4 | 3.0 | −1.60 |
| 91.2 | 2.9 | −1.49 |

*Azeotrope

TABLE 5a per cent variation of the vapour pressure due to evaporation losses of the mixture V

| | Composition, % wt. | | | Temp- ature, ° C. | Initial pressure bar | (ΔP/P) 100 |
|---|---|---|---|---|---|---|
| Example No. | R 236fa | R 600 | R 236ea | | | |
| 12 (Azeotrope) | 81.6 | 3.0 | 15.4 | −1.75 | 1.01 | 0.00 |
| 13 | 48.8 | 2.9 | 48.3 | −1.75 | 0.98 | 1.02 |
| 14 | 86.4 | 3.0 | 10.6 | −1.75 | 1.00 | 1.00 |

In Table 6 the main characteristics of the azeotropic mixtures indicated in the preceding Examples are reported in comparison with R 114 and R 124.

TABLE 6 chemical-physical properties of the azeotropes

| | Units | REF. R 114 | REF. R 124 | Mixture No. 1 R 236ea /E 134 (54.9) (45.1) | Mixture No. 4 R 236ea /R 134 (65.2) (34.8) | Mixture No. 7 R 236fa /600 (94.1) (5.9) | Mixture No. 9 R 23Bfa /600 /E 134 (57.8) (4.9) (37.3) | Mixture No. 12 R 236fa /600 /236ea (81.6) (3.0) (15.4) |
|---|---|---|---|---|---|---|---|---|
| Molecular mass | g/mole | 170.9 | 136.5 | 134.6 | 138.2 | 138.8 | 128.1 | 145.0 |
| Rolling temperature | ° C. | 4.23 | −11.92 | 3.72 | −6.87 | −1.47 | −6.90 | −1.75 |
| Vapour pressure, 25° C. | bar | 2.11 | 3.82 | 2.30 | 3.30 | 2.70 | 3.29 | 2.73 |
| Vapour prssure, 50° C. | bar | 4.43 | 7.76 | 5.00 | 6.95 | 5.75 | 6.67 | 5.84 |
| ODP (CFC11 = 1) | (−) | 0.8 | 0.022 | 0.0 | 0.0 | 0.0 | 0.0 | 0.0 |
| HGWP (CFC11 = 1) | (−) | 4.14 | 0.11 | 0.41 | 0.34 | 0.10 | 0.36 | 0.10 |

EXAMPLE 2
Solubility of Lubricant Oil in the Refrigerating Mixtures

The lubricant oil is introduced in a glass test tube with thick walls, resistant to high pressures, and closed at an end by a metal valve.

After cooling, the refrigerating mixture is introduced in the previously evacuated test tube, then the system is dipped in a thermostatic bath.

The temperature is slowly increased from 25° C. to 80° C. and then, always slowly, is lowered to −70° C. in order to identify possible unmixing temperatures of the oil (cloud point).

Examples of solubility of different lubricating oils in some mixtures of the present invention are reported in Table 7.

TABLE 7 solubility in lubricant oils

| | | Concentration | Critical solution temperature, ° C. | |
|---|---|---|---|---|
| FLUID | OIL | oil, % wt | UCST* | LCST** |
| R 114 | MO | 4.7 | −61 | >60 |
| Reference | Clavus 32 | 8.2 | −50 | >60 |
| R 124 | MO | 4.8 | +7.8 | >60 |

TABLE 7-continued solubility in lubricant oils

| | | Concentration | Critical solution temperature, ° C. | |
|---|---|---|---|---|
| FLUID | OIL | oil, % wt | UCST* | LCST** |
| Reference Mixture No. 1 | Clavus 32 | 9.1 | +29.5 | >60 |
| | POE | 4.6 | <−70 | >80 |
| | Icematic SW 32 | 8.5 | <−70 | >80 |
| Mixture No. 4 | POE | 4.7 | <−70 | >80 |
| | Icematic SW32 | 8.9 | <−70 | >80 |
| Mixture No. 4 | FO | 5.1 | +3 | >80 |
| | Fomblin Y14/6 | 8.3 | +12 | >80 |

TABLE 7-continued solubility in lubricant oils

| | | Concentration | Critical solution temperature, ° C. | |
|---|---|---|---|---|
| FLUID | OIL | oil, % wt | UCST* | LCST** |
| Mixture No. 7 | MO | 0.6 | +28 | >80 |
| | Clavus 32 | 4.5 | P.S. | P.S. |
| Mixture No. 9 | MO | 0.5 | +29 | >80 |
| | Clavus 32 | 4.6 | P.S. | P.S. |
| Mixture No. 12 | MO | 0.4 | +33 | >80 |
| | Clavus 32 | 4.5 | P.S. | P.S. |
| Mixture No. 12 | FO | 5.0 | <+5 | >80 |
| | Fomblin Y14/6 | 8.2 | <+5 | >80 |
| Mixture No. 12 | POE | 4.7 | <−70 | >80 |
| | Icematic 6W32 | 8.3 | <−70 | >80 |

*Critical solution temperature (solubility gap at low temperature)
**Critical solution temperature (solubility gap at high temperature)
P.S.: partially soluble
MO, POE, FO are abbreviations whiCh respeCtively mean mineral oil, polyol ester oil and fluorinated oil.

EXAMPLE 3
Tests of Chemical Stability

The mixtures according to the invention were subjected to a chemical stability test in the presence of metals (copper and steel), acording to the ASHRAE 97-1983 method with some small modifications reported hereinafter: in a glass tube having diameter of 4.5 mm and heigth of 250 mm one copper and one steel specimen and about 1 ml of lubricant oil are introduced.

The tube is then inserted in a steel cylinder fitted to exactly contain it, equipped with valve. The cylinder is evacuated and cooled, then the refrigerating mixture (1 ml) is introduced; the cylinder is closed and put in a stove at 175° C. for 14 days.

After such treatment, the refrigerant is analyzed by gaschromatography to indentify the possible presence of by-products deriving from degradation reactions of the refrigerant.

The oil is titrated for determining the possible increase of the acidity (expressed as mg KOH/g oil).

The metal specimen are submitted to visual examination to point out possible surface modifications due to corrosion and to deposit formation.

The evaluations are carried out considering as reference a system formed by R 114/mineral oil/metals and R 124/mineral oil/metals.

In Tables 8a and 8b some examples relating to the chemical stability are reported.

TABLE 8a chemical stability
ASHRAE TEST (14 DAYS-175° C.)

| Fluid | Oil | Metals | Colour | Acidity (°) before/after | Metals Visual evaluation Copper | Steel |
|---|---|---|---|---|---|---|
| R 114 Reference | MO* | copper/steel | yellowing (++) | 0.01/0.30 | opaque | unchanged |
| R 124 Reference | MO* | copper/steel | yellowing (++) | 0.01/0.10 | opaque | unchanged |
| Mixture No. 1 | POE** | copper/steel | yellowing (+) | 0.10/0.16 | opaque | unchanged |
| Mixture No. 4 | POE** | copper/steel | yellowing (+) | 0.09/0.15 | opaque | unchanged |
| Mixture No. 1 | FO*** | copper/steel | unchanged | 0.03/0.04 | opaque | unchanged |
| Mixture No. 4 | FO*** | copper/steel | unchanged | 0.03/0.04 | opaque | unchanged |

(+++++) Intensity of the phenomenon

| GASCHROMATOGRAPHIC ANALYSIS By-products after test, % wt. | |
|---|---|
| Fluid | By-products, % wt. |
| R 114 | 0.15 |
| R 124 | 0.07 |
| Mixture No. 1 | <0.01 |
| Mixture No. 2 | <0.01 |
| Mixture No. 1 | <0.01 |
| Mixture No. 2 | <0.01 |

TABLE 8b chemical stability
ASHRAE TEST (14 DAYS-175° C.)
RESULTS

| Fluid | Oil | Metals | Colour | Acidity (°) before/after | Metals Visual evaluation Copper | Steel |
|---|---|---|---|---|---|---|
| R 114 Reference | MO* | copper/steel | yellowing (++) | 0.01/0.30 | opaque | opaque |
| R 124 Reference | MO* | copper/steel | yellowing (++) | 0.01/0.10 | opaque | opaque |
| Mixture No. 7 | MO* | copper/steel | yellowing (++) | 0.01/0.03 | opaque | unchanged |
| Mixture No. 9 | MO* | copper/steel | yellowing (++) | 0.01/0.02 | opaque | unchanged |
| Mixture No. 12 | MO* | copper/steel | unchanged | 0.01/0.02 | opeque | unchanged |
| Mixture No. 12 | POE** | copper/steel | unchanged | 0.10/0.18 | opague | unchenged |
| Mixture No. 12 | FO*** | copper/steel | unchanged | 0.03/0.03 | opaque | unchenged |

| GASCHROMATOGRAPHIC ANALYSIS By-products after test, % wt. | |
|---|---|
| Fluid | By-products, % wt. |
| R 114 | 0.15 |
| R 124 | 0.07 |
| Mixture No. 7 | <0.01 |
| Mixture No. 9 | <0.01 |
| Mixture No. 12 | <0.01 |
| Mixture No. 12 | <0.01 |
| Mixture No. 12 | <0.01 |

*mineral oil SHELL Clavus ® 32
**ester oil Castrol Icematic ® SW32 (POE)
***PFPE oil AUSIMONT Fomblin ® Y14/6
(°) mgKOH/g OIL

What is claimed is:

1. A method for heating or cooling an object using a heat pump or air conditioner or similar refrigeration machine, said method comprising using a near azeotropic or azeotropic composition based on hexafluoropropane (R 236) as a drop-in substitute for 1,2-dichlorotetrafluoroethane (R 114), wherein said composition consists essentially of:
   1) 1,1,1,3,3,3-hexafluoropropane (R 236fa) 90–98% by wt.
      n-butane (R 600) 2–10% by wt.,
   2) 1,1,1,3,3,3-hexafluoropropane (R 236fa) 35–85% by wt.
      n-butane (R 600) present in an amount of lower than 5% by wt.
      bis(difluoromethyl) ether (RE 134) 5–63% by wt., or
   3) 1,1,1,3,3,3-hexafluoropropane (R 236fa) 40–88% by wt.
      n-butane (R 600) present in an amount of lower than 5% by wt.
      1,1,1,2,3,3-hexafluoropropane (R 236ea) 2–58% by wt.

2. The method according to claim 1 wherein said composition exhibits an absolute minium boiling temperature at the pressures and temperatures recited below with respect to pure components, and said composition has the following components:

1) 1,1,1,3,3,3-hexafluoropropane (R 236fa) 94.1% by wt.
   n-butane (R 600) 5.9% by wt.,
   temperature −1.47° C.
   pressure: 1.013 bar;
2) 1,1,1,3,3,3,-hexafluoropropane (R 236fa) 57.8% by wt.
   n-butane (R 600) 4.9% by wt.,
   bis(difluoromethyl) ether (RE 134) 37.3% by wt.,
   temperature −6.90° C.
   pressure: 1.013 bar; or
3) 1,1,1,3,3,3,-hexafluoropropane (R 236fa) 81.6% by wt.
   n-butane (R 600) 3% by wt.,
   1,1,1,2,3,3-hexafluoropropane (R 236ea) 15.4% by wt.,
   temperature −1.75° C.
   pressure: 1.013 bar.

3. The method according to claim 1 wherein the composition is combined with a lubricating oil.

4. The method according to claim 3, wherein the composition 1) is combined with a lubricating oil selected from the group consisting of polyol esters (POE), perfluoropolyethers (PFPE), mineral oils and alkyl benzene oils.

5. The method according to claim 4, wherein the POE and PFPE oils have the following characteristics:

a solubility of at least 5.0% by weight at a temperature range between −5 and 60° C. for air conditioning applications and a range of 5° C. and 80° C. for heat pump applications;

a viscosity at 40° C. between 18–110 cSt;

a viscosity index of at 20° C. between 90–200;

an initial acid value <0.15 mgKOH/g oil;

an acidity value of after ASHRAE test 97-1983<0.3 mg KOH/g oil;

a moisture content lower than 50 ppm; and a pour point of −5° C.

6. The method according to claim 3, wherein the composition is between 35–99% by weight and the lubricating oil is between 1–65% by weight.

* * * * *